United States Patent [19]
Sato et al.

[11] Patent Number: 5,333,092
[45] Date of Patent: Jul. 26, 1994

[54] MAGNETIC RECORDING AND REPRODUCING SYSTEM FOR RECORDING AND REPRODUCING VIDEO SIGNALS CORRESPONDING TO AN AUDIO SIGNAL

[75] Inventors: Yoshiaki Sato; Nobuya Sakai, both of Tokyo, Japan

[73] Assignee: Asahi Kogaku Kogyo Kabushiki Kaisha, Tokyo, Japan

[21] Appl. No.: 658,276

[22] Filed: Feb. 20, 1991

[30] Foreign Application Priority Data

Feb. 20, 1990 [JP] Japan ................................. 2-39366

[51] Int. Cl.⁵ ...................... H04N 5/781; H04N 5/91; C11B 5/02
[52] U.S. Cl. ................................. 360/35.1; 360/27; 360/19.1; 360/22; 358/341; 358/906
[58] Field of Search ...................... 360/11.1, 19.1, 22, 360/33.1, 35.1, 27; 358/341, 906

[56] References Cited

U.S. PATENT DOCUMENTS

| | | | |
|---|---|---|---|
| 4,065,794 | 12/1977 | Shutterly | 360/19.1 |
| 4,065,795 | 12/1977 | Shutterly | 360/35.1 |
| 4,531,161 | 7/1985 | Murakoshi | 360/10.1 |
| 4,611,248 | 9/1986 | Honjo et al. | 360/19.1 |
| 4,675,755 | 6/1987 | Baumeister et al. | 360/35.1 |
| 4,725,897 | 2/1988 | Konishi | 360/10.1 |
| 4,860,122 | 8/1989 | Kanamaru | 360/19.1 |
| 4,959,735 | 9/1990 | Kawai | 360/33.1 |
| 5,130,816 | 7/1992 | Yoshio | 358/341 |

FOREIGN PATENT DOCUMENTS

| | | |
|---|---|---|
| 0180477 | 5/1986 | European Pat. Off. |
| 0223423 | 5/1987 | European Pat. Off. |
| 250358 | 2/1990 | Japan . |
| 8601619 | 3/1986 | PCT Int'l Appl. |

OTHER PUBLICATIONS

Engineering Department, Electronic Industries Association of Japan, "Specification of Still Video Floppy Disc Systems," Sep. 1987.

Primary Examiner—Edward P. Westin
Assistant Examiner—Benjamin D. Driscoll
Attorney, Agent, or Firm—Sughrue, Mion, Zinn, Macpeak & Seas

[57] ABSTRACT

An audio signal recorded on a single track of a magnetic disk and a plurality of corresponding or associated video signals recorded on successive coaxial tracks are reproduced by determining the playback time of the audio signal, and dividing it by the number of video signals. In this manner the video signals are successively reproduced for equal time periods, to thus "synchronize" their display with the continuous, protracted playback of the audio signal.

34 Claims, 7 Drawing Sheets

MAGNETIC RECORDING AND REPRODUCING SYSTEM FOR RECORDING AND REPRODUCING VIDEO SIGNALS CORRESPONDING TO AN AUDIO SIGNAL

BACKGROUND OF THE INVENTION

This invention relates to a magnetic recording and reproducing system such as an electronic still camera, in which video signals and audio signals are recorded, in combination, in coaxial tracks on a magnetic disk and each video signal is reproduced for a constant reproducing period in combination with the corresponding audio signal.

An electronic still camera is so designed that video signals and audio signals are recorded on the magnetic disk. More specifically, in a normal mode, the video signals and the audio signals are recorded independently of each other; and in an AV mode, they are recorded in combination in coaxial tracks adjacent to each other on a magnetic disk. Therefore, the video signals and audio signals are reproduced separately when recorded in the normal mode, and simultaneously when recorded in the AV mode.

In the conventional electronic still camera, audio signals recorded in a plurality of tracks can be provided for a video signal recorded in one track, but video signals recorded in a plurality of tracks cannot be provided for an audio signal recorded in one track. Hence, it is difficult to achieve an operation such that, while an audio signal having an arbitrary length is being continuously reproduced, different video images are reproduced successively for the same period of time.

SUMMARY OF THE INVENTION

In view of the foregoing, an object of this invention is to provide a magnetic recording and reproducing device with which a plurality of video tracks provided for an audio track having an arbitrary length are reproduced successively for the same period of time with ease.

The foregoing object has been achieved by the provision of a magnetic recording device having an audio/video mode in which a plurality of video signals corresponding to an audio signal are recorded on coaxial tracks of a magnetic recording disk, which are adjacent to a coaxial track for the audio signal, comprises a measuring means for measuring an actual period of time for recording the audio signal, a recording means for recording the video signals and the corresponding audio signal selectively on the coaxial tracks of the magnetic recording disk, and a control means for controlling said recording means so as to record the video signal together with distinguishing data representing presence or absence of the following video track where the remaining video signal corresponding to the audio signal is to be recorded, said control means controlling said recording means so as to record the audio signal together with data as to the measurement result of said measuring means and a start video track where the first video signal is to be recorded.

When video signals and an audio signal have been recorded on the disk in combination, the disk reproducing device operates as follows: With the audio track or the video tracks reproduced in advance, the reproducing time of the audio signal and the number of video tracks are detected, and the reproducing time of each video signal is determined from the value which is obtained by dividing the reproducing time of the audio signal by the number of video tracks. Therefore, with respect to an audio signal having an optional length, a plurality of video signals corresponding to the audio signal can be successively reproduced for the same period of time with ease.

The above recording and reproducing operation is accomplished by a magnetic recording and reproducing device having an audio/video mode in which a plurality of video signals corresponding to an audio signal are recorded on coaxial tracks of a magnetic recording disk, which are adjacent to a coaxial track for the audio signal and the audio and video signals are reproduced in combination, comprises: a measuring means for measuring an actual period of time for recording the audio signal; a recording and reproducing means for recording and reproducing the video signals and the corresponding audio signal in combination; a detecting means for detecting the number of video tracks corresponding to the audio signal from the signal reproduced by said signal recording and reproducing means; an arithmetic means for obtaining a reproducing period of time for each video signal based on the measurement result of said measuring means and an output of said detecting means; and a control means for controlling said recording and reproducing means so as to record the video signal together with distinguishing data representing presence or absence of the following video track where the remaining video signal corresponding to the audio signal is to be recorded, said control means controlling said recording means so as to record the audio signal together with data as to the measurement result of said measuring means and a start video track where the first video signal is to be recorded, said control means controlling said signal recording and reproducing means to reproduce each of the video signals for the reproducing period obtained by said arithmetic means during the actual reproducing period of time with the reproduction of the corresponding audio signal.

The present disclosure relates to the subject matter contained in Japanese patent application No. Hei. 2-39366 (filed Feb. 20, 1990) which is expressly incorporated herein by reference in its entirety.

DETAILED DESCRIPTION OF THE PREFERRED EMBODIMENT

Figure 2:
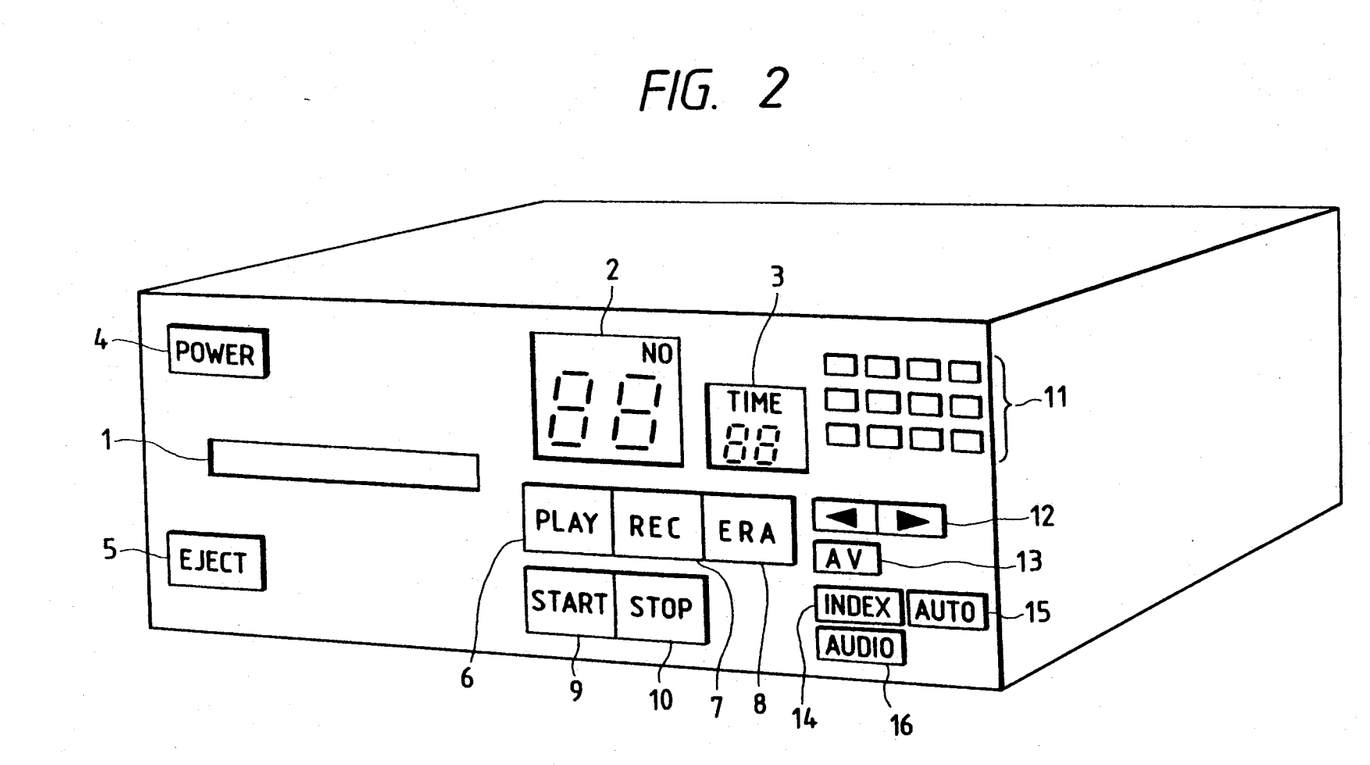
FIG. 2 is a perspective view showing the external appearance of the disk recording and reproducing device.

FIG. 2 is a perspective view showing the external appearance of one example of a disk recording and reproducing device according to this invention, namely, a disk recording and reproducing device which can not only record signals on a magnetic disk but also reproduce signals therefrom.

An insertion opening 1 through which a magnetic disk is loaded in the device, display sections 2 and 3 for displaying a track number and time, various switches, etc. are provided on the front panel of the device.

A power switch 4 is operated to turn on or off the power source, and an eject switch 5 is operated to eject the magnetic disk from the device. A play switch (PLAY) 6, a record switch (REC) 7, and an erase switch (ERA) 8 are operated to set a reproducing (playback) mode, a recording mode, and an erasing mode, respectively. A start switch (START) 9 and a stop switch (STOP) 10 are operated to start and stop the operation in each of the operating modes.

A pad 11 is operated to input numerical data. A moving switch 12 is operated to access the track which is located one track radially inwardly or outwardly of the current track. An AV mode switch 13 is operated to set an AV mode. An index switch (INDEX) 14 is operated to record index signals. An auto switch (AUTO) 15 is operated to automatically access tracks one after another. A sound receiving switch (AUDIO) 16 is operated to receive audio signals, and to stop the reception of audio signals.

Figure 3:
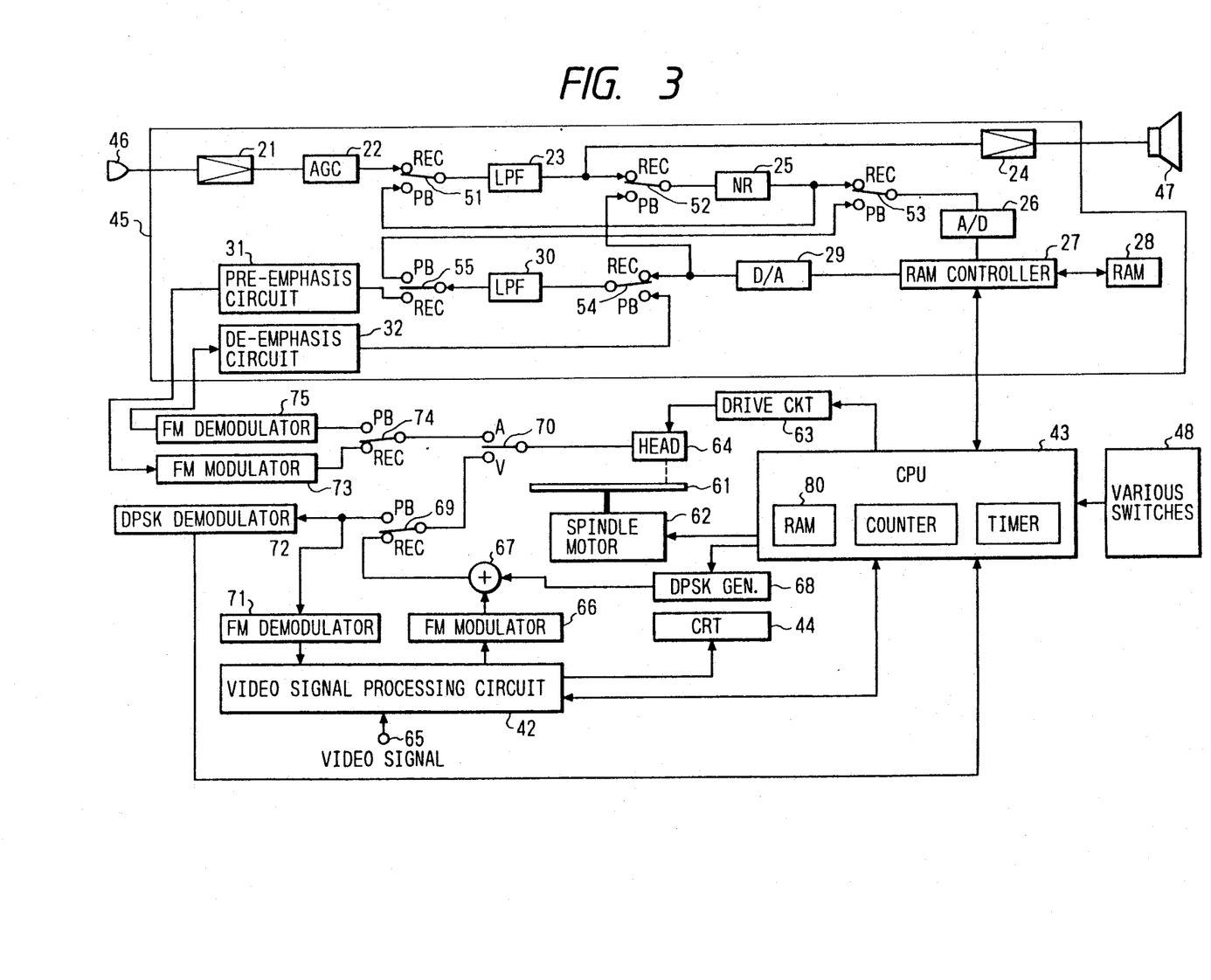
FIG. 3 is a block diagram showing the electrical arrangement of the disk recording and reproducing device.

FIG. 3 is a block diagram showing the arrangement of the disk recording and reproducing device of the invention.

A magnetic disk 61 is rotated by a spindle motor 62. A CPU 43 comprising a microcomputer drives the spindle motor 62. A drive circuit 63 drives a magnetic head 64 to move to a predetermined track. When various switches 48 which are provided on the front panel of the device shown in FIG. 2, are operated, signals are applied to the CPU 43.

A video signal is applied to an external input terminal 65 by an image pickup circuit (not shown) including an image pickup device such as a CCD (charge-coupled device). The video signal is applied to a video signal processing circuit 42, where it is processed as required. The output signal of the video signal processing circuit 42 is applied to an FM modulator 66 where it is subjected to FM modulation. The output signal of the FM modulator 66 is applied to an adder 67, to which a DPSK signal provided by a DPSK signal generator 68 is supplied. In the adder 67, the two inputs are subjected to addition. The result of addition is supplied through change-over switches 69 and 70 to the magnetic head 64. In this case, movable contacts of the switches 69 and 70 are positioned to transfer the signal as described above in response to the actuation of the record switch 7.

The video signal outputted by the head 64 is applied through the switch 70 and the switch 69 to an FM demodulator 71 and a DPSK demodulator 72. The FM demodulator 71 and the DPSK demodulator 72 separate, extract and demodulate the signals in their own frequency components. The demodulated signals are applied through the video signal processing circuit 42 to a CRT 43 and a CPU 44, respectively.

An audio signal obtained through a microphone 46 is applied through another external input terminal to an audio signal processing circuit 45.

In the audio signal processing circuit 45, an audio signal from the microphone 46 is amplified by an amplifier 21. The amplified signal is subjected to signal processing in the following an automatic gain control (AGC) circuit 22, a switch 51, a low-pass filter (LPF) 23, a switch 52 and a noise reduction (NR) circuit 25. The output of the NR circuit 25 is applied through a switch 53 to an A/D (analog-to-digital) converter 26. After the A/D conversion, the digital audio signal is written through a RAM controller 27 to a RAM 28. In this case, the switches 51 and 52 are switched as shown in FIG. 3 in response to the operation of the REC switch 7. In addition, the CPU 43 operates to write a control code in a control code region of the RAM 28.

The audio signal which is once stored in the RAM 28 is read out to be applied through the RAM controller 27 to a D/A converter 29. In the D/A converter 29, the audio signal is converted to the analog audio signal. The analog audio signal is applied through a switch 54, to a low-pass filter 30 and a switch 55, a preemphasis circuit 31 to an FM modulator 73. The FM modulated signal passes through a switch 74 and the switch 70 to the magnetic head 64 so that the audio signal and control code are recorded on the disk 61.

In the reproducing (playback) mode which is selected by the PLAY switch 6, the audio signal which is read out from the magnetic disk 61 is applied through the switches 70 and 74 to an FM demodulator 75 to be subjected to FM demodulation. The FM-demodulated audio signal is applied through a de-emphasis circuit 32, the switch 54, the low-pass filter 30, the switches 55 and 53 to the A/D converter 26. In the A/D converter 26, the analog audio signal is converted to a digital audio signal to be stored through the RAM 28 through the RAM controller 27. Then the audio signal read out of the RAM 28 is subjected to signal processing in the D/A converter 29 and the NR circuit 25. After the amplification in an amplifier 24, the audio signal is reproduced by a loudspeaker 47.

In response to the input signals from the various switches 48, the CPU 43 operates to trip the movable contacts of the switches 69 and 74 over to the contact REC in the recording mode, and to the contact PLAY in the reproducing mode. Furthermore, the CPU 43 operates to trip the movable contact of the switch 70 to the contact A in recording or reproducing an audio signal, and to the contact V in recording or reproducing a video signal.

In operation, in response to the insertion of a disk 64 into the opening, the CPU 43 drives the spindle motor 62 to rotate the disk 61. Then, the CPU 43 performs a pre-search operation as shown in the flow chart of FIG. 1.

Figure 1:
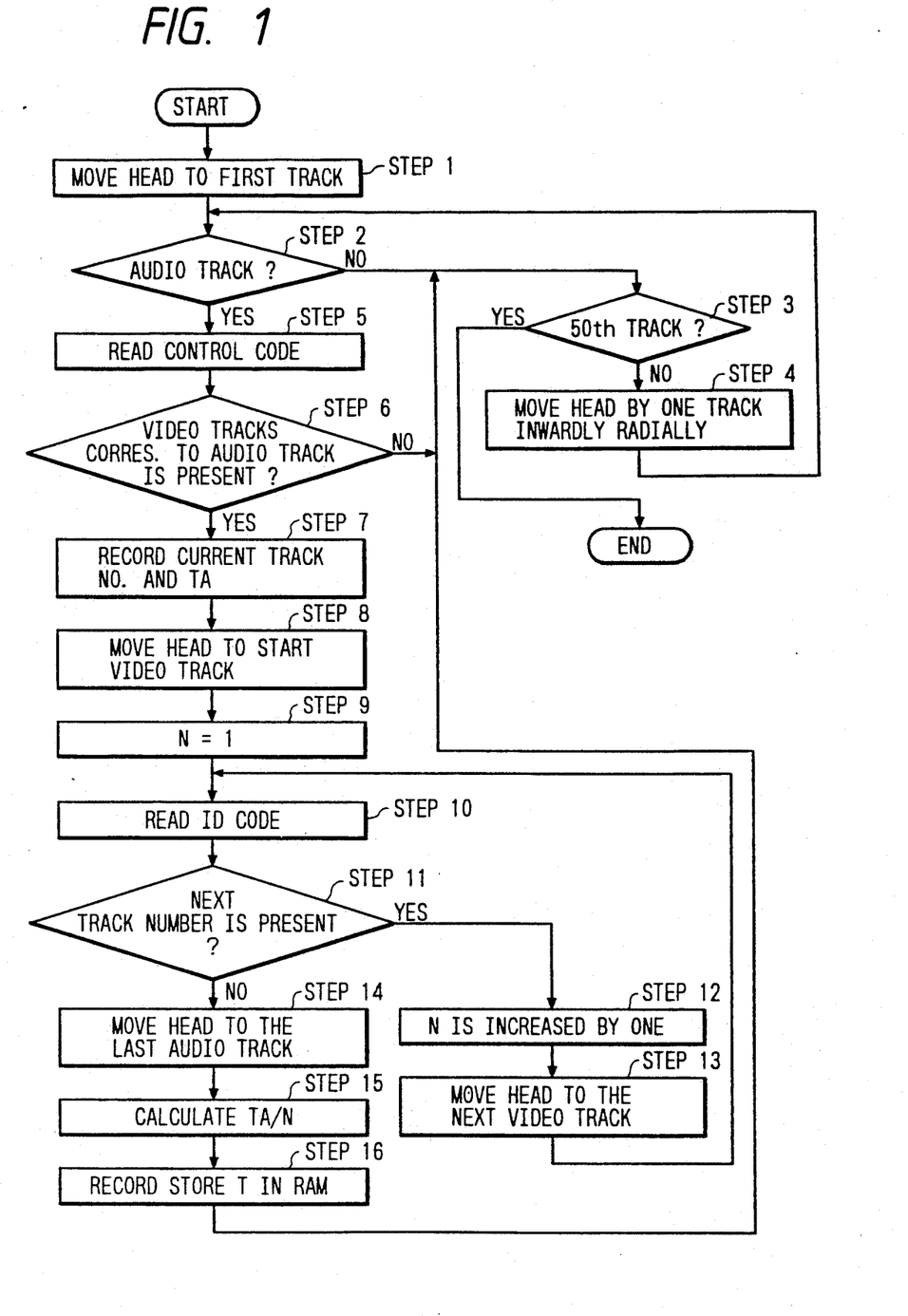
FIG. 1 is a flow chart for describing a pre-search operation of a disk reproducing device according to this invention.

In the pre-search operation, the CPU drives the drive circuit 63 to move the head 64 (reproducing means) radially so that the head 64 is positioned at a position corresponding to the first track. (Step 1) The CPU judges according to the determination as to whether the first track is an audio track or not. (Step 2) If not, the process advances to Step 3 where it is detected whether the head position corresponds to the 50th final track. In this Step 3, if it is detected that the head position corresponds to the 50th track, this pre-search operation is ended. On the other hand, if the answer is "No" in Step 3, the process returns to the Step 2 after moving the head 64 by one track radially inwardly.

The control code which is determined to meet such a well known Still Video format as proposed by Electronic Industries Association of Japan, contains data representing whether or not the audio signal has been recorded in the AV mode; i.e., whether or not a corresponding video track is available. (Step 6) Therefore, it is determined from the control code (Word 3) whether or not the corresponding video tracks are available. In the above-described embodiment, it is determined from the control code whether or not the track is an AV mode track.

When the corresponding video tracks are available, the start track number Vs of the corresponding Video tracks and the reproducing time $T_A$ of the audio signal in the audio track is detected, and they are stored in a RAM 80 in the memory built in the CPU 43. (Step 7) (detecting memory). The reproducing time $T_A$ which is recorded in an area corresponding to a control code during a recording mode, is indispensable to the present invention. The recording mode is described later.

The control code may contain data on the first track number of the video signal corresponding to the audio signal, as described later in more detail. The CPU 43 reads the number from the control code, and moves the head 64 to the start video track, to allow the latter to reproduce the video signal (Step 8). The reproduced video signal is applied through the switches 70 and 69 to both the FM demodulator 71 and the DPSK demodulator 72. The DPSK signal demodulator 72 demodulates the DPSK signal, and applies the demodulated output to the CPU 43. According to the demodulated output, the CPU 43 operates to obtain the number N of video tracks corresponding to the audio signals (Steps 9–13).

More specifically, the DPSK signal is stored in the RAM 80 according to such a well known Still Video format as proposed by Electronic Industries Association of Japan. According to the present invention, the number of the following video track of the corresponding series of video tracks is stored in each video track but such number is not recorded on the last video track. The number of the following track is recorded with the video signal in User's area of an ID code determined according to the video signal recording format. Hence, the video tracks are successively searched until the last track where no number of the following track is stored, is detected, as a result of which the number N of video tracks corresponding to the audio track is counted.

Of course, in the case where the DPSK signal or the control code contains data representing the number of video tracks corresponding to the audio track, such data may simply be read.

Next, the CPU 43 drives the head 64 to move to the audio track. (Step 14) In the CPU 43, the actual reproducing time $T_A$ of the audio signal detected in the Step 7 is divided by the video track number N, to obtain the reproducing time T of each video track (Step 15). The reproducing time T thus obtained is stored in the RAM 80 built in the CPU 43 (Step 16). (Arithmetic means) Then the step returns to the step 3 and this operation continues until the head 64 reaches the 50th final track.

Consequently, the audio track numbers, the actual reproducing time $T_A$ of the audio track recorded in the AV mode in the loaded disk, and the number N of video tracks corresponding to the audio track, have been detected by pre-search.

Figure 4:
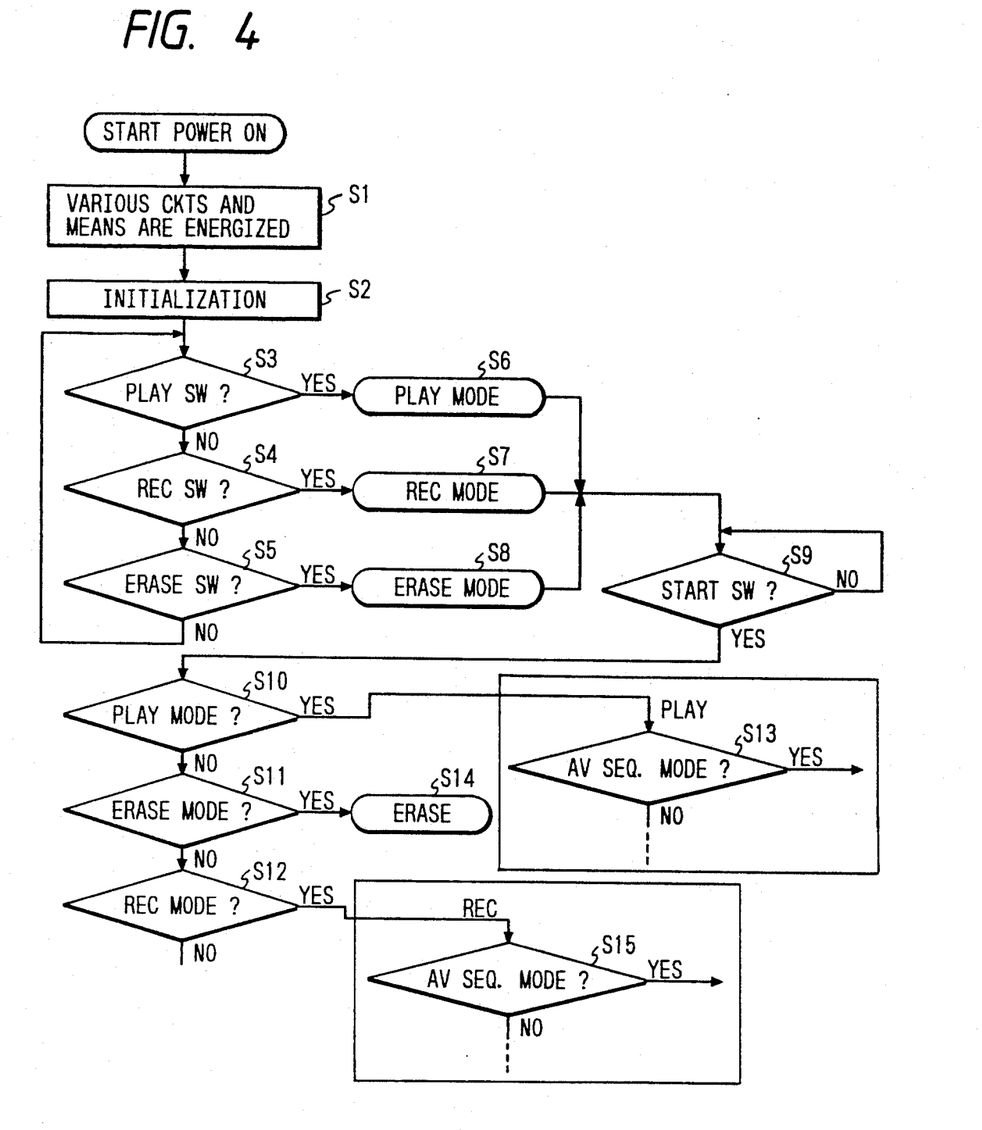
FIG. 4 is a flow chart for describing the fundamental operation of the disk recording and reproducing device.

In response to the operations of the switches 48, the CPU 43 carries out operations as shown in the flow chart of FIG. 4.

When the power switch 4 is turned on, the various circuits and means are energized, and initialized (Steps S1 and S2). Next, it is determined whether or not the play switch 6, the record switch 7 or the erase switch 8 has been operated, and in response to such determination a playback (reproduce) mode, a record mode, or an erase mode is set (Steps S3 through S8).

Furthermore, it is determined whether or not the start switch 9 has been operated, and in response thereto, a reproducing operation, a recording operation or an erasing operation is carried out in correspondence to the set mode (Steps S9 through S15).

Figure 5:
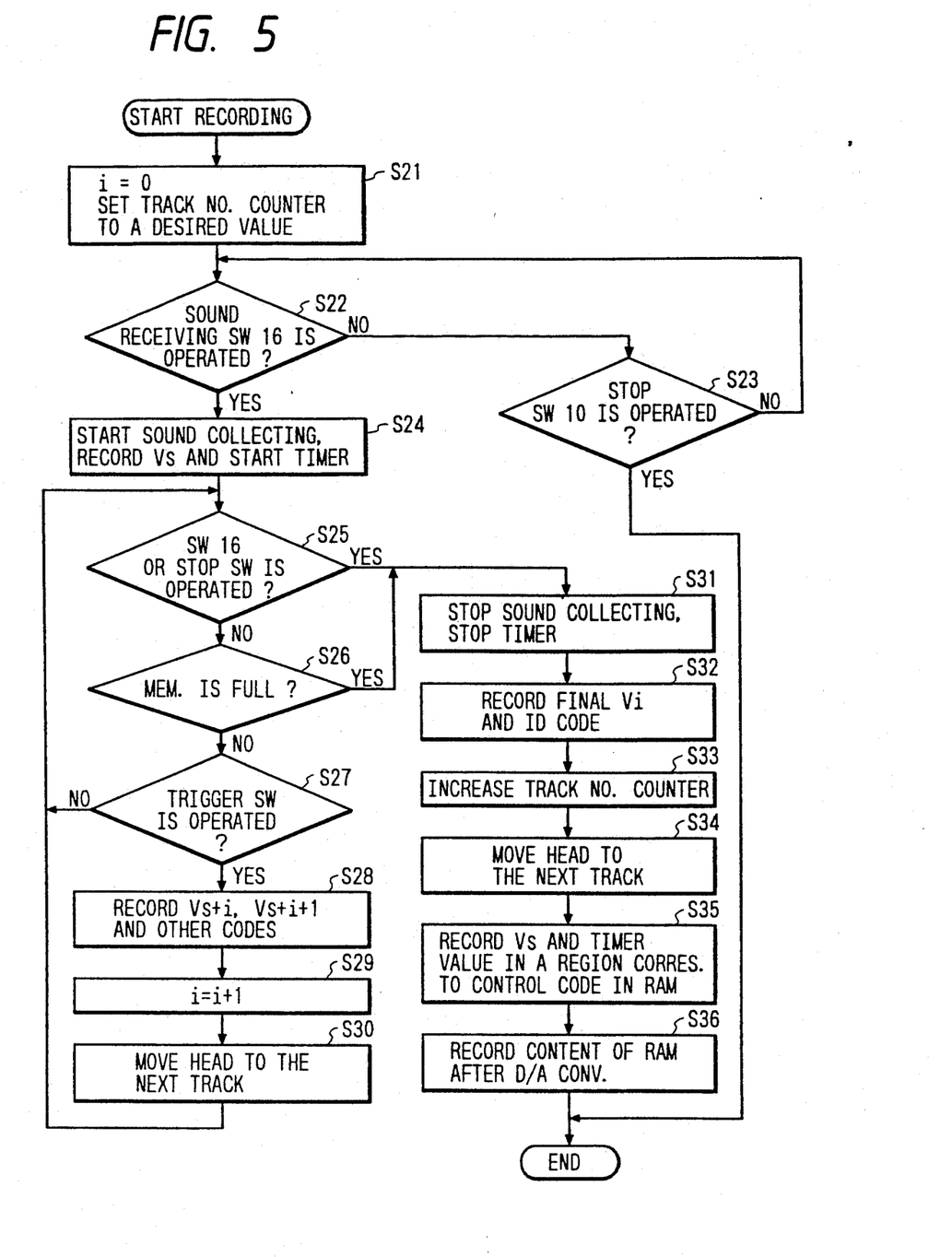
FIG. 5 is a flow chart for describing the signal recording operation of the device.

When, in the record mode, the switch 13 is operated to specify the AV mode, the CPU 43 performs operations as indicated in the flow chart of FIG. 5.

First a variable i of a counter of the CPU 43 is set to "0" and a track number counter of the CPU 43 is also set to a desired value manually by the operator. It should be noted that the head 64 is moved to the track corresponding to the desired value. The CPU 43 waits until the sound receiving switch 16 is operated (Steps S21 through S23). If the stop switch 10 is operated before the sound receiving switch 16, the recording operation is stopped (Step S23).

When the sound receiving switch 16 is turned on, a sound receiving operation is started. Then, a timer for the sound receiving operation starts and a track number Vs of a current track is stored (Step S24). An audio signal which is received by the microphone 46 is applied to the audio signal processing circuit 45 where it is compressed logarithmically for noise reduction in the NR circuit 25, and emphasized. The audio signal thus processed is subjected to analog-to-digital (A/D) conversion in the A/D converter 26 and time-axis compression, and stored through the RAM controller 27 in the RAM 28 serving as an audio memory.

This sound receiving operation is continued until either the stop switch 10 or the sound receiving switch 16 is operated or the audio memory becomes full (Steps S25 and S26). The audio signal which has been subjected to time-axis compression is stored in the RAM 28.

When a video trigger switch (which is provided additionally, or may be constituted by the start switch 9) is operated during the sound receiving operation (Step S27), the video signal detected at this time instant is recorded in the current track where the head 64 is positioned, as an ID code including the number of the track $V_{s+i+1}$ ($V_{s+1}$ in this case, because i=0 at first) in which a video signal is to be recorded next (the track being located one track radially inwardly of the current track, for instance) (Step S28). That is, a video signal inputted through the external input terminal 65 is applied to the video signal processing circuit 42, where it is subjected to necessary treatment such as, for instance, emphasizing. The output of the video signal processing circuit 36 is applied to the FM modulator 66, where it is FM-modulated.

The CPU 43 causes the DPSK signal generator 68 to produce the DPSK signal corresponding to an ID code including the number (address) $V_{S+1}$ of the track located by one track radially inwardly (or outwardly) of the current track where the head 64 is positioned, in which the video signal corresponding to the audio signal being received is recorded next. In this case, the next track is located one track radially inwardly. The DPSK signal is applied to the adder 67, where it is superposed (multiplexed) to the output of the FM modulator 66. The output of the adder 67 is applied through the switches 69 and 70 to the head 64.

In this operation, under the control of the CPU 43 the spindle motor 62 is driven by the drive circuit 63, so that the disk 61 is rotated, for instance, at a speed of 3600 rpm (in the case of an NTSC system). As a result, the FM-modulated video signal of one field, for instance, and the DPSK signal containing the data on the next track number ($V_{s+i+1}$) are recorded on one predetermined track ($V_s$).

When the video signal has been recorded in the above-described manner, the variable i is increased by one (1) and the content of the counter in the CPU 43 is also increased by one (1), so that the head 64 is moved radially inwardly to the next track through the drive circuit 63 (Steps S29 and S30), and Step S25 is effected again.

The above-described operations are carried out repeatedly, so that the video signals corresponding to the audio signal being received are recorded on a plurality of tracks.

The above-described operations are performed for any track. Setting i=0 does not mean that access is made to the first track (whose track number is 0) of the disk.

When either the stop switch 10 or the sound receiving switch 16 is operated or the audio memory becomes full during the sound receiving operation, the sound receiving operation is stopped and the timer is stopped accordingly (Step S31). The last video signal and ID code are recorded and the track number is increased by one (Step S33). Since this track is to record the last video signal, no number of the track where the next video signal is to be recorded is included in the ID code.

The head 64 is further moved one track radially inwardly (Step S34), so that the received audio signal is recorded together with the number Vs of the first track where the corresponding video signal has been recorded in an area corresponding to the control code in the RAM 28 (Step S35). The measurement value of the timer contained in the CPU 43 (Step S31), which represents an actual sound reproducing (receiving) period $T_A$, is also recorded in the area for the control code in the RAM 28. Since there is provided with a region in which an user or operator can use freely to store necessary data temporarily, in the area corresponding to the control code, with an embodiment of the present invention, a region is allotted as words 6 to 8 to record the above-described actual sound reproducing (receiving) period $T_A$.

Next, the audio signal and the data representative of the actual sound reproducing period $T_A$ which have been stored according to the predetermined format in the RAM 28 is read out therefrom so as to be subjected to D/A conversion in the D/A converter 29. Thus obtained analog signal is then subjected to the FM modulation in the FM modulator 75 after the signal processing. The output signal of the FM modulator 75 is applied through the switches 74 and 70 to the head 64, so that it is recorded on the track which is located one track radially inwardly of the track where the corresponding last video signal has been recorded.

Figure 6:
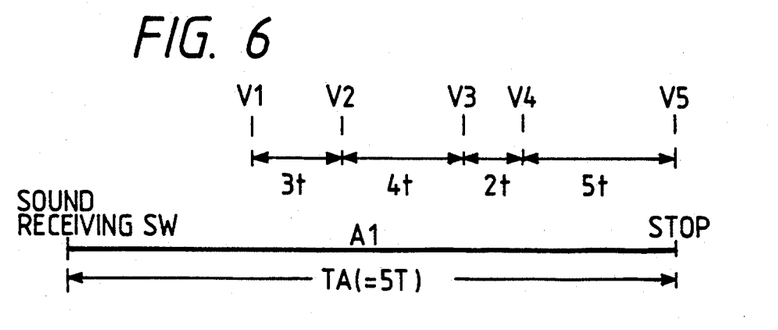
FIGS. 6 and 9 are timing charts for describing the signal recording and reproduction operations of the device.

FIG. 6 is a timing chart for the above-described operations. After the sound receiving switch 16 is turned on to start the sound receiving operation, the start (trigger) switch 9 is turned on at predetermined time intervals 3t, 4t and 2t, and with the lapse of the actual sound receiving time $T_A$ in this case the stop switch 10 is turned on. As a result, the video signals $V_1$ through $V_5$ are recorded on the first through fifth tracks which are located by one track radially inwardly in the stated order, respectively. In this operation, at the same time when modulation is carried out, an ID code including the number of the following second track is recorded on the first track; an ID code including the number of the third track is recorded on the second track; an ID code including the number of the fourth track is recorded on the third track; and an ID code including the number of the fifth track is recorded on the fourth track.

Figure 8:
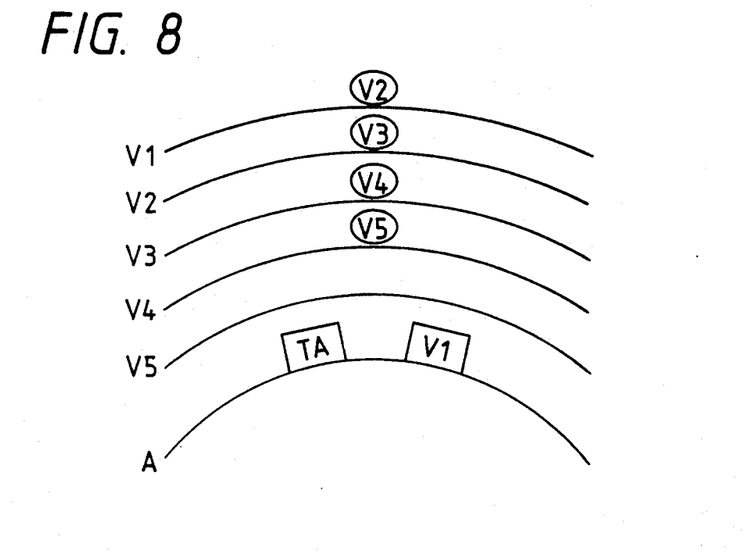
FIG. 8 is a diagram showing a track arrangement on a magnetic disk.

The audio signal $A_1$ having the reproducing time $T_A$ corresponding to those video signals is recorded through time-axis compression in the track which is radially inwardly next to the fifth track; i.e., the sixth track. The number Vs of the first track where the first video signal corresponding to the audio signal $A_1$ is recorded in an area for the control code in the sixth track. The above described track arrangement is shown in FIG. 8.

Figure 7:
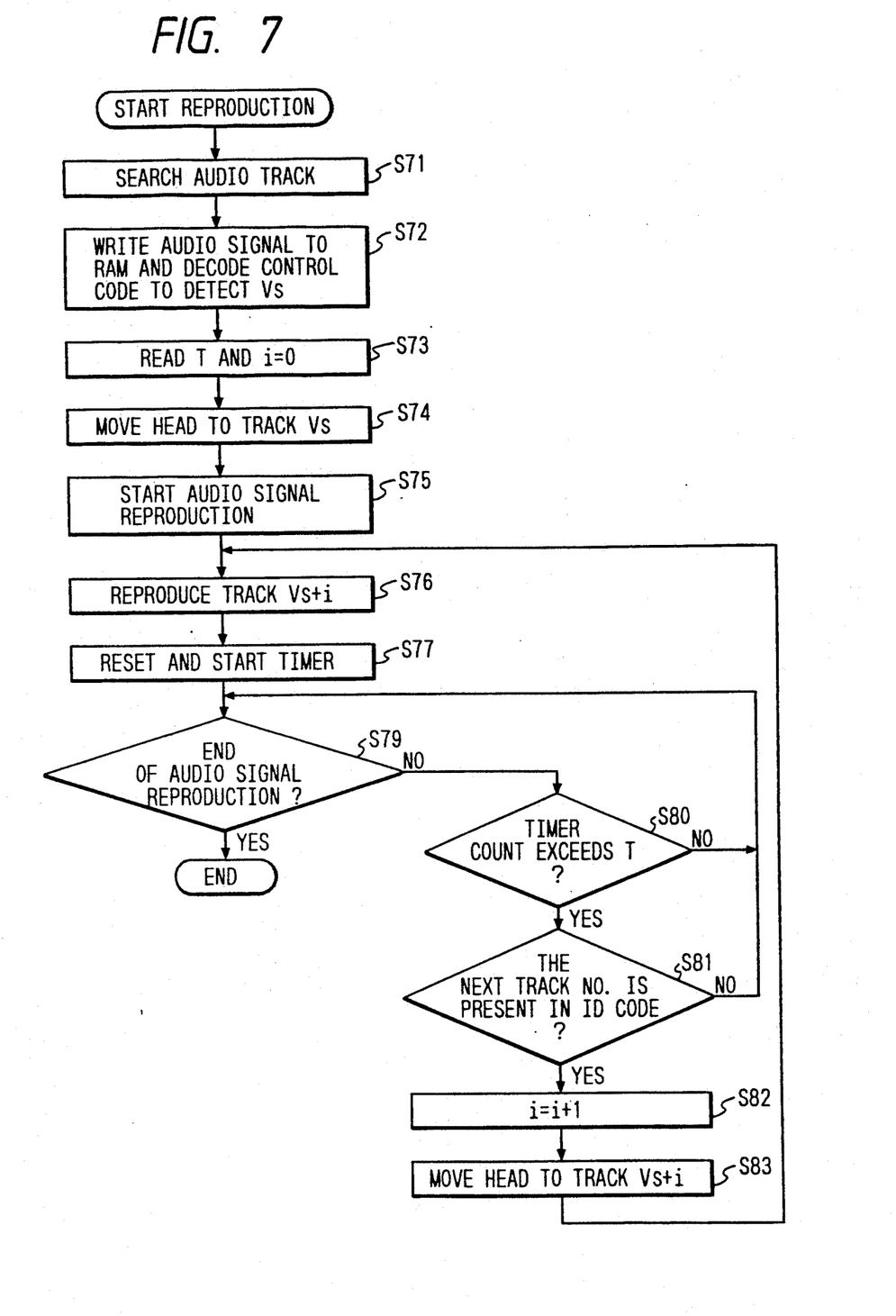
FIG. 7 is a flow chart for describing the signal reproducing operation of the device.

Next, the signal reproducing operation will be described with reference to the flow chart of FIG. 7. When the signal reproducing mode is set, an operation for searching an audio track is carried out so that the head 64 is moved to the track where the audio signal has been recorded (Step S71). Then, the audio signal is reproduced to be stored in the audio memory RAM 28. The control code which is contained in the audio signal is decoded to detect the first track number Vs where the first video signal corresponding to the audio signal recorded on the thus detected audio track has been stored (Step S72).

In response to the detection signal which is obtained in the step S72, the CPU 43 operates the drive circuit 63 to cause the head 64 to access the first video track.

When the writing of the audio signal into the audio memory RAM 28 has been completed, the reproducing period of time T for each of the video tracks, which is obtained in the above described pre-search operation is read out from the RAM 80. Further, the variable i is set to 0. (Step S73) The head 64 is moved to the track Vs where the first of the video signals corresponding to the audio signal has been recorded (Step S74). The audio signal stored in the audio memory 28 is then read out through time axis expansion, and is subjected to digital-to-analog (D/A) conversion in which time-axis expansion is carried out. Further, the signal is subjected to treatment such as logarithmic expansion for noise reduction, before being applied to the loudspeaker 41. At the same time when the reading of the audio signal from the RAM 28 starts, the video signal is reproduced simultaneously. (Step S75 and S76)

The FM demodulator 71 extracts the frequency band of the video signal from the input signal, and demodulates it. The demodulated signal is applied to the video signal processing circuit 42, where it is subjected to treatment such as deemphasis before being applied to the CRT 44.

When the video signal reproducing operation is started in this manner, the CPU 43 resets its built in timer and starts it (Step S77). When the timer counts up to the time T before the reproduction of the audio signal has been completed (Step S80), it is detected whether the track number for the following track to be reproduced is included in the ID code of the DPSK signal (Step S81). If not in the step 80 or 81, the step returns to the step S79. Then, the variable i is increased by one (1) (Step S82). As a result, the head 64 is moved radially inwardly to the next track where the next video signal has been recorded, so as to reproduce it (Steps S79 through S83).

Thus, the video signals recorded on the tracks are successively reproduced in such a manner that each video signal is reproduced for the calculated reproducing time T. The signal reproducing operation is ended when the reproduction of the audio signal has been accomplished, in the case where the number of the next video signal is not recorded in the video track.

Figure 9:
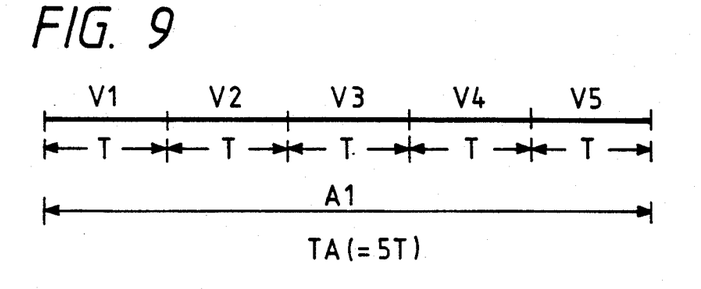

FIG. 9 is a timing chart showing the above-described signal reproducing operation. When the signal reproducing operation is started, the first through last video signals $V_1$ through $V_5$ are each reproduced for the same time T irrespective of the intervals 3t, 4t, 2t and 5t taken in the signal recording operation shown in FIG. 6. At the same time, the corresponding audio signal $A_l$ is continuously reproduced for the actual reproducing period of time $T_A (=5T)$.

As described above, according to the present invention, an actual reproducing period of time $T_A$ and the number of video signals (video tracks) n can be obtained in advance during a pre-search operation, and therefore it is possible to reproduce each of the video signals with a constant reproducing period of time expressed by $T = T_A/N$.

What is claimed is:

1. A recording device having an audio/video mode in which a plurality of video signals corresponding to an audio signal are recorded on coaxial tracks of a recording disk, which are adjacent to a coaxial track for the audio signal, comprising:
    a measuring means for measuring an actual period of time for recording the audio signal;
    a recording means for recording the video signals and the corresponding audio signal selectively to the coaxial tracks of the recording disk; and
    a control means for controlling said recording means so as to record each video signal together with distinguishing data representing presence or absence of a following video track where a next video signal corresponding to the audio signal is to be recorded, said control means controlling said recording means so as to record the audio signal together with data as to the measurement result of said measuring means and a start video track where a first of said plurality of video signals is to be recorded.

2. The device as defined in claim 1 wherein said recording means comprises an audio memory for storing the audio signal and the measurement result data and a signal processing means for processing each video signal and the distinguishing data according to a predetermined still video recording format.

3. The device as defined in claim 1 wherein the data representing presence or absence of a following video track is data representing the number of track following a current track, in which said next video signal is to be recorded.

4. The device as defined in claim 2 wherein the measurement result is recorded in a region corresponding to a control code in an audio track according to the predetermined still video recording format, and the distinguishing data is recorded in a region corresponding to an ID code in a video track according to the predetermined still video recording format.

5. The device as defined in claim 1 wherein said control means operates to control said recording means to record a final video signal corresponding to said audio signal without the distinguishing data when said measuring means completes the measurement of the actual recording period of time.

6. A reproducing device having an audio/video mode in which an audio signal and a plurality of video signals corresponding to the audio signal are reproduced in combination from a disk, comprising:
    a signal reproducing means for reproducing the signals recorded on the disk;
    a first detecting means for detecting an actual reproducing period of time for the audio signal from the signal reproduced by said signal reproducing means;
    a second detecting means for detecting a number of video tracks corresponding to the audio signal from the signal reproduced by said signal reproducing means;
    an arithmetic means for obtaining a reproducing period of time for each video signal based on outputs of said first and second detecting means; and
    a control means for controlling said signal reproducing means to reproduce each of the video signals for the reproducing period obtained by said arithmetic means during the actual reproducing period of time with the reproduction of the corresponding audio signal.

7. The device as defined in claim 6 wherein the actual reproducing period of time and the number of a start track of the video signal are read out from a region corresponding to a control code in the audio track according to a predetermined still video recording format, and data as to a next track following the start track where the next video signal has been stored is reproduced from a region corresponding to an ID code in the video track according to the predetermined still video recording format.

8. The device as defined in claim 6 wherein the reproducing period of each of the video signals are made constant.

9. The device as defined in claim 6 wherein the data as to the next track is data representing the number of the next track.

10. The device as defined in claim 6 wherein said control means control said signal reproducing means to stop the reproduction of the video signal recorded on a track where no next track data is recorded, at the end of the actual reproducing period of time for the audio signal.

11. A recording and reproducing device having an audio/video mode in which a plurality of video signals corresponding to an audio signal are recorded on coaxial tracks of a recording disk, which are adjacent to a coaxial track for the audio signal and the audio and video signals are reproduced in combination, comprising:
    a measuring means for measuring an actual period of time for recording the audio signal;
    a recording and reproducing means for recording and reproducing the video signals and the corresponding audio signal in combination;
    a detecting means for detecting a number of video tracks corresponding to the audio signal from the signal reproduced by said signal recording and reproducing means;

an arithmetic means for obtaining a reproducing period of time for each video signal based on the measurement result of said measuring means and an output of said detecting means; and a control means for controlling said recording and reproducing means so as to record the video signal together with distinguishing data representing presence or absence of a further video track where a further video signal corresponding to the audio signal is to be recorded, said control means controlling said recording means so as to record the audio signal together with data as to the measurement result of said measuring means and a start video track where a first video signal is to be recorded, said control means controlling said signal recording and reproducing means to reproduce each of the video signals for the reproducing period obtained by said arithmetic means during reproduction of the corresponding audio signal.

12. The device as defined in claim 11 wherein said recording and reproducing means comprises an audio memory for storing the audio signal and the measurement result data and a signal processing means for processing the video signal and the distinguishing data according to a predetermined still video recording format.

13. The device as defined in claim 11 wherein the data representing presence or absence of a further video track is data representing the number of a track following a current track, in which the further video signal is to be recorded.

14. The device as defined in claim 12 wherein the measurement result is recorded to a region corresponding to a control code in the audio track according to the predetermined still video recording format, and the distinguishing data is recorded in a region corresponding to an ID code in the video track according to the predetermined still video recording format.

15. The device as defined in claim 11 wherein said actual period of time and the number of said start video track are read out from a region corresponding to a control code in the audio track according to a predetermined still video recording format, and data as to a next track following the start track where the next video signal has been stored is reproduced from a region corresponding to an ID code in the video track according to the predetermined still video recording format.

16. The device as defined in claim 11 wherein the reproducing period of each of the video signals are made constant.

17. The device as defined in claim 15 wherein the data as to the next track is data representing the number of the next track.

18. The device as defined in claim 11 wherein said control means operates to control said recording means to record a final video signal without the distinguishing data when said measuring means completes the measurement of the actual recording period of time.

19. A recording device having an audio/video mode in which a plurality of video signals are recorded together with an audio signal corresponding thereto, comprising:

an audio signal collecting means for collecting during an audio signal collecting period the audio signal to be stored in a memory means after signal processing;

a video signal input terminal to which the video signals are applied;

an audio memory control means for generating first track data indicating a first coaxial track to which a first video signal produced first within said audio signal collecting period is to be recorded and for generating collecting period data indicating the audio signal collecting period, and for controlling writing and reading operations of the audio signal to said memory means in a predetermined audio signal recording format, said first track data being recorded together with said collecting period data in the audio signal recording format;

a recording means for selectively recording together the audio signal supplied from said memory means through said memory control means and the video signals applied through said video signal input terminal on coaxial tracks of a recording medium; and a control means for controlling said recording means to record the first video signal generated first within the audio signal collecting period with a first data for designating another video track following the first coaxial track of said recording means in a predetermined video signal recording format, said control means controlling said recording means to record at least two video signals generated following the first video signal within the audio signal collection period in other coaxial tracks which are designated by said first data and by second data contained in the video recording format for a second video signal, respectively, and said control means controlling said recording means to record a final video signal on a coaxial final track which is designated by the second data and to record the audio signal which has been stored in said memory means on a coaxial track following the final video track, at the end of the audio signal collecting period after data for designating a following track is detected in the video signal recording format for the video signal preceding the final video signal.

20. The device as defined in claim 19 wherein the audio signal collecting period is set manually according to an audio signal collecting mode.

21. The device as defined in claim 20 wherein the audio signal collecting period is terminated by a stop input signal voluntarily.

22. The device as defined in claim 19 wherein the data indicating the audio signal collecting period and the first video track are recorded in a control code area in the audio signal recording format.

23. The device as defined in claim 19 wherein the first and second data are recorded in an area for an ID code in the video signal recording format.

24. A recording device comprising recording means for recording an audio signal together with at least one video signal corresponding to said audio signal on a recording medium, said device further comprising:

control means for controlling said recording means to record on said recording medium different time value data in addition to said audio and video signals, said data including information indicating the duration of a reproduction time of said at least one video signal;

wherein said data includes a number of video signals corresponding to said audio signal.

25. A recording device comprising recording means for recording an audio signal together with at least one video signal corresponding to said audio signal on a recording medium, said device further comprising:
control means for controlling said recording means to record on said recording medium different time value data in addition to said audio and video signals, said data including information indicating the duration of a reproduction time of said at least one video signal;
wherein said data includes a running time of said audio signal; and
wherein said data includes a number of video signals corresponding to said audio signal.

26. A recording device comprising recording means for recording an audio signal together with at least one video signal corresponding to said audio signal on a recording medium, said device further comprising:
control means for controlling said recording means to record on said recording medium different time value data in addition to said audio and video signals, said data including information indicating the duration of a reproduction time of said at least one video signal;
wherein said data includes a designation of each video signal corresponding to said audio signal.

27. A recording device comprising recording means for recording an audio signal together with at least one video signal corresponding to said audio signal on a recording medium, said device further comprising:
control means for controlling said recording means to record on said recording medium different time value data in addition to said audio and video signals, said data including information indicating the duration of a reproduction time of said at least one video signal;
wherein said data includes a running time of said audio signal; and
wherein said data includes a designation of each video signal corresponding to said audio signal.

28. A recording device comprising recording means for recording an audio signal together with at least one video signal corresponding to said audio signal on a recording medium, said device further comprising:
control means for controlling said recording means to record on said recording medium different time value data in addition to said audio and video signals, said data including information indicating the duration of a reproduction time of said at least one video signal;
wherein said recording device further comprises measuring means for measuring said running time of said audio signal and means for generating said data in response to said measuring means.

29. A reproducing device, comprising:
reproducing means for reproducing from a recording medium an audio signal together with at least one video signal corresponding to said audio signal, and for also reproducing data in addition to said audio and video signals and indicating the duration of a reproduction time of said at least one video signal;
determining means responsive to said reproduced data for determining said reproduction time of said at least one video signal; and
means responsive to said determining means for controlling said reproducing means to reproduce said at least one video signal for said determined reproduction time;
wherein said data includes a running time of said audio signal.

30. A reproducing device, comprising:
reproducing means for reproducing from a recording medium an audio signal together with at least one video signal corresponding to said audio signal, and for also reproducing data in addition to said audio and video signals and indicating the duration of a reproduction time of said at least one video signal;
determining means responsive to said reproduced data for determining said reproduction time of said at least one video signal; and
means responsive to said determining means for controlling said reproducing means to reproduce said at least one video signal for said determined reproduction time;
wherein said data includes a number of video signals corresponding to said audio signal.

31. A reproducing device as defined in claim 29, wherein said data includes a number of video signals corresponding to said audio signal.

32. A reproducing device, comprising:
reproducing means for reproducing from a recording medium an audio signal together with at least one video signal corresponding to said audio signal, and for also reproducing data in addition to said audio and video signals and indicating the duration of a reproduction time of said at least one video signal;
determining means responsive to said reproduced data for determining said reproduction time of said at least one video signal; and
means responsive to said determining means for controlling said reproducing means to reproduce said at least one video signal for said determined reproduction time;
wherein said data includes a designation of each video signal corresponding to said audio signal.

33. A reproducing device as defined in claim 29, wherein said data includes a designation of each video signal corresponding to said audio signal.

34. A reproducing device, comprising:
reproducing means for reproducing from a recording medium an audio signal together with at least one video signal corresponding to said audio signal, and for also reproducing data in addition to said audio and video signals and indicating the duration of a reproduction time of said at least one video signal;
determining means responsive to said reproduced data for determining said reproduction time of said at least one video signal; and
means responsive to said determining means for controlling said reproducing means to reproduce said at least one video signal for said determined reproduction time;
wherein said determining means determines a running time of said audio signal and a number of video signals corresponding to said audio signal, and then determines said reproduction time of said at least one video signal in accordance with the determined audio signal running time and number of corresponding video signals.

* * * * *